(12) United States Patent
Nakai

(10) Patent No.: US 7,860,947 B2
(45) Date of Patent: Dec. 28, 2010

(54) STORAGE MEDIUM AND DOWNLOADING METHOD

(75) Inventor: Hidekazu Nakai, Tokyo (JP)

(73) Assignee: Sony Corporation, Tokyo (JP)

( * ) Notice: Subject to any disclaimer, the term of this patent is extended or adjusted under 35 U.S.C. 154(b) by 1049 days.

(21) Appl. No.: 10/037,334

(22) Filed: Nov. 9, 2001

(65) Prior Publication Data

US 2002/0124093 A1    Sep. 5, 2002

(30) Foreign Application Priority Data

Nov. 10, 2000    (JP) .............................. 2000-349339

(51) Int. Cl.
 *G06F 15/16* (2006.01)
 *G11B 15/04* (2006.01)
(52) U.S. Cl. ..................................... 709/219; 369/53.2
(58) Field of Classification Search .................. 711/4, 711/112; 717/176–178; 709/217–219, 227–232; 705/26; 369/53.2, 53, 21
See application file for complete search history.

(56) References Cited

U.S. PATENT DOCUMENTS

| | | | | | |
|---|---|---|---|---|---|
| 6,047,376 | A * | 4/2000 | Hosoe | .................. | 713/201 |
| 6,064,635 | A * | 5/2000 | Machiguchi | .................. | 369/30.31 |
| 6,154,773 | A * | 11/2000 | Roberts et al. | .................. | 709/219 |
| 6,205,112 | B1 * | 3/2001 | Weidner | .................. | 369/275.3 |
| 6,330,593 | B1 * | 12/2001 | Roberts et al. | .................. | 709/217 |
| 6,385,596 | B1 * | 5/2002 | Wiser et al. | .................. | 705/51 |
| 6,434,535 | B1 * | 8/2002 | Kupka et al. | .................. | 705/24 |
| 6,460,076 | B1 * | 10/2002 | Srinivasan | .................. | 709/219 |
| 6,529,453 | B1 * | 3/2003 | Otsuka et al. | .................. | 369/30.32 |
| 6,529,946 | B2 * | 3/2003 | Yokono et al. | .................. | 709/217 |
| 6,553,492 | B1 * | 4/2003 | Hosoe | .................. | 713/153 |
| 6,587,837 | B1 * | 7/2003 | Spagna et al. | .................. | 705/26 |
| 6,654,797 | B1 * | 11/2003 | Kamper | .................. | 709/220 |
| 6,748,485 | B1 * | 6/2004 | Yokota et al. | .................. | 711/112 |
| 6,868,403 | B1 * | 3/2005 | Wiser et al. | .................. | 705/51 |
| 6,947,362 | B2 * | 9/2005 | Sako et al. | .................. | 369/53.21 |
| 2002/0013784 | A1 * | 1/2002 | Swanson | .................. | 707/104.1 |
| 2002/0055969 | A1 * | 5/2002 | Sato et al. | .................. | 709/203 |
| 2002/0062357 | A1 * | 5/2002 | Srinivasan | .................. | 709/219 |

FOREIGN PATENT DOCUMENTS

| | | |
|---|---|---|
| JP | 10-063365 | 3/1998 |
| JP | 10-290441 | 10/1998 |

(Continued)

OTHER PUBLICATIONS

Dave Matthews Band ticket information, printed from a Aug. 25, 2001 archive of ticketmaster.com.*

*Primary Examiner*—Yasin Barqadle
(74) *Attorney, Agent, or Firm*—Oblon, Spivak, McClelland, Maier & Neustadt, L.L.P.

(57) ABSTRACT

The invention provides a storage medium and a downloading method by which data can be downloaded comparatively simply and efficiently. Program information describing a downloading procedure is stored in a storage medium, and the storage medium is provided in this form to a user. When the user utilizes the storage medium, a procedure that can be executed to perform necessary processing without depending upon an operation of the user can be included in the process from accessing to a server to final downloading of desired content data. Consequently, the necessary number of operations by the user can be reduced as much.

6 Claims, 12 Drawing Sheets

FOREIGN PATENT DOCUMENTS

| | | |
|---|---|---|
| JP | 2000-148504 | 5/2000 |
| JP | 2000-173182 | 6/2000 |
| JP | 2000-196585 | 7/2000 |
| JP | 2000-250863 | 9/2000 |
| JP | 2000-341266 | 12/2000 |

* cited by examiner

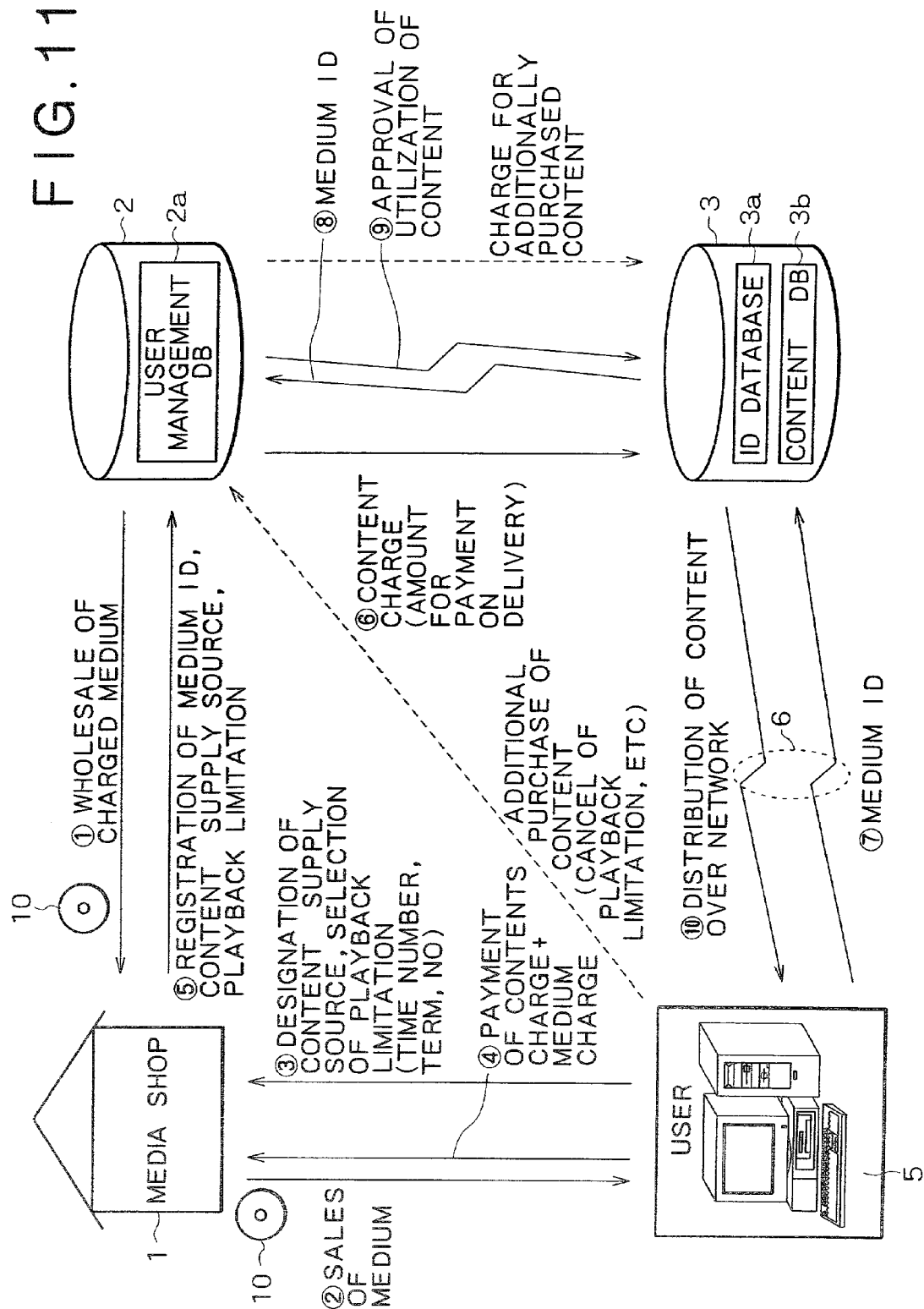

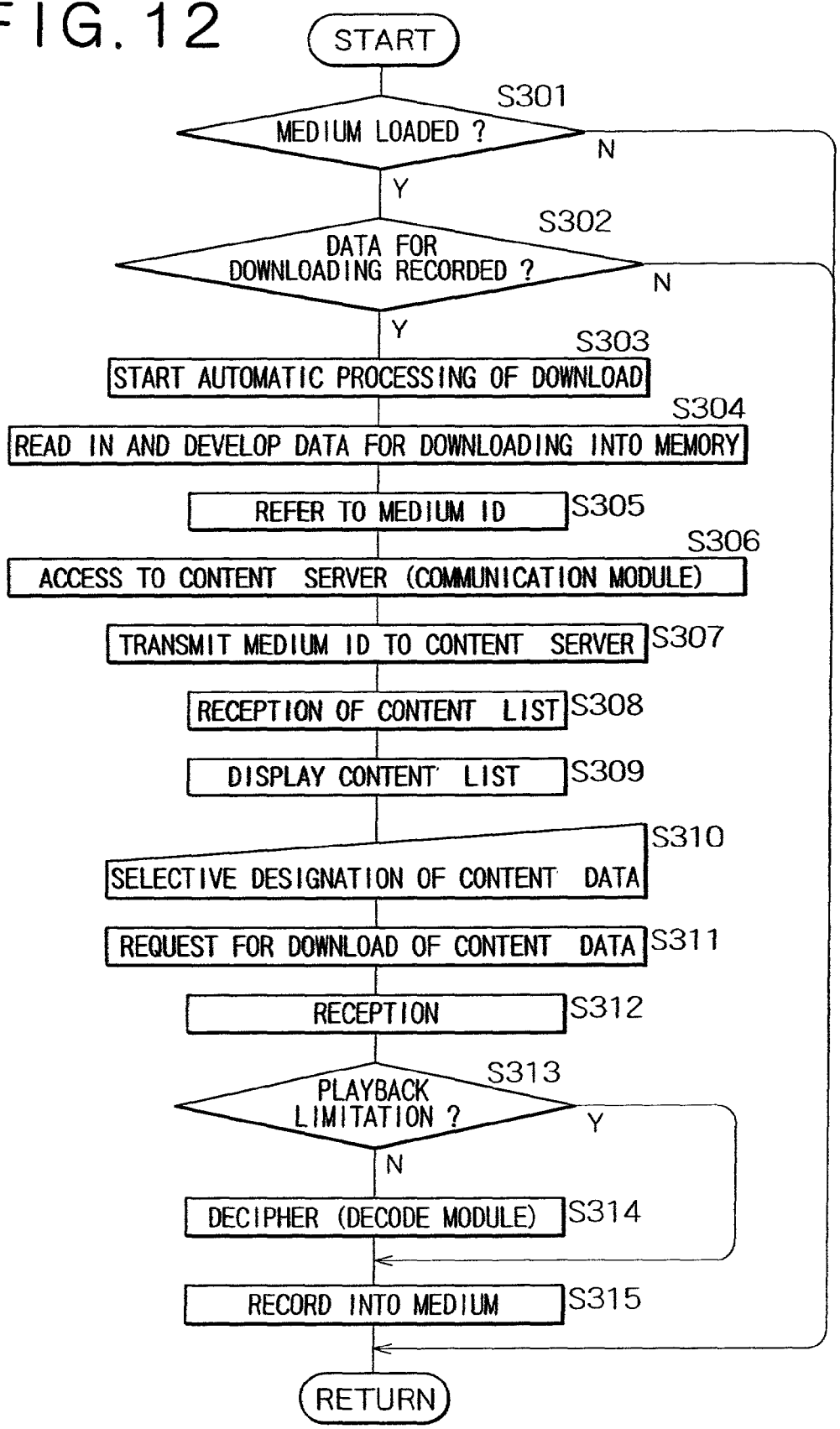

STORAGE MEDIUM AND DOWNLOADING METHOD

BACKGROUND OF THE INVENTION

This invention relates to a storage medium that can store data acquired, for example, by downloading and a downloading method that makes use of a storage medium of the type mentioned.

In recent years, various services that can download content data such as, for example, digital audio data over a network such as, for example, the Internet have been popularized.

For such downloading of content data, for example, a user starts up application software of an Internet browser installed in a personal computer or the like and operates the personal computer to access a target server through the Internet. The server has, for example, digital audio data of a large number of tunes stored therein as content data.

After the personal computer is connected to the server in such a manner as described above, it issues a request for a tune (digital audio data) selectively designated, for example, by an operation of the user to the server. Thereupon, the user performs several necessary operations such as, for example, inputting of a card number of a credit card so as to make it possible to perform settlement of a consideration for data to be downloaded.

The server first confirms, for example, establishment of settlement and then searches for data of the requested tune and then transmits the searched out data to the personal computer. In other words, the server performs uploading. The personal computer receives the data and writes the data onto a recording medium such as, for example, a hard disk to store them. Downloading of, for example, tune data is performed in such a manner as just described.

To the user, it is preferable that such downloading as described above can be performed in an easier and simpler operation procedure and method. Further, if such easier and simpler downloading is possible, this is preferable also to the party who provides download data because the degree of utilization by such users is likely to increase.

SUMMARY OF THE INVENTION

It is an object of the present invention to provide a storage medium and a downloading method by which data can be downloaded comparatively simply and efficiently.

In order to attain the object described above, according to an aspect of the present invention, there is provided a recording medium, having a first storage region in which program information describing a procedure for executing a process for establishing a connection to a predetermined server over a predetermined communication network and downloading data from the connected server is stored, and a second storage region into which the data can be written.

With the recording medium, the program information describing a procedure for executing a downloading process is stored in the first storage region. Therefore, if an apparatus, for example, for downloading reads out and refers to the program information stored in the storage medium, then the procedure of accessing to a predetermined server and downloading data from the server can be executed automatically without particularly depending upon an operation of the user.

When the recording medium is utilized, a process for realizing operation required for accessing to and downloading from a server in accordance with the program information can be executed. Consequently, in the process from accessing to a server to final downloading of desired content data, a procedure that can be executed to perform necessary processing can be included in the process without depending upon an operation of the user. Therefore, the recording medium is advantageous in that a downloading operation can be executed more simply and readily than ever.

Preferably, the recording medium has a third storage region having an ID unique to the recording medium stored therein. The ID may be information that can be utilized by the server to manage accounting for the downloaded data, to identify a type of the download data or to identify a supply source of the download data.

Since the ID unique to the recording medium is stored in the recording medium, the server side can utilize the ID to specify the medium (that is, the user) and provide a download service more favorable to the user. Also the server side can achieve more effective user management and can achieve protection of the copyright of an enterprise, an artist or the like by which contents data are provided.

According to another aspect of the present invention, there is provided a downloading method, comprising a readout step of reading out, from a recording medium having a first storage region in which program information describing a procedure for executing a process for establishing a connection to a predetermined server over a predetermined communication network and downloading data from the connected server is stored and a second storage region into which the data can be written, the program information, an access step of accessing the server in accordance with the read out program information, a download step of downloading required data from the server accessed in accordance with the read out program information, and a storage control step of storing the data acquired by the downloading into the second storage area of the storage medium.

With the downloading method, after the program information describing the downloading procedure stored in the storage medium is read out, the procedure for accessing a server and downloading data from the server can be executed automatically. This signifies that a procedure for allowing, when it is tried, for example, to access a predetermined server and download data from the server, such accessing and downloading to be executed automatically without particularly depending upon an operation of the user. Consequently, the downloading method is advantageous in that a downloading operation can be executed more simply and readily than ever.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 11 is a diagrammatic view showing an example of a configuration of a downloading system for a charged medium to which the present invention is applied; and FIG. 12 is a flow chart illustrating a processing procedure for performing downloading operation of the downloading system of FIG. 11.

DESCRIPTION OF THE PREFERRED EMBODIMENTS

In the following, preferred embodiments of the present invention are described. In the embodiments described below, the present invention is applied to a downloading system wherein a user purchases a storage medium and utilizes the storage medium to have content data to be downloaded over a predetermined communication network.

The description proceeds in accordance with the following order:
1. System for Non-Charged Medium
1-1. System Configuration
1-2. User Terminal Equipment
1-3. Disk Medium
1-4. Memory Device Medium
1-5. Processing Operation
2. System for Charged Medium 1. System for Non-Charged Medium 1-1. System Configuration In the embodiments of the present invention described below, two different kinds of media onto which downloaded data can be recorded are proposed in regard to a charge to be paid by a user when a medium is purchased.

One of the media is a "charged medium" for which a price additionally including a charged amount of money for content data to be downloaded is set, and the other is a "non-charged medium" for which a price is set without additionally including a charged amount of money relating to downloading of content data. The downloading system has different functions for the two different media just described.

First, the downloading system ready for the latter "non-charged medium" is described.

Figure 1:
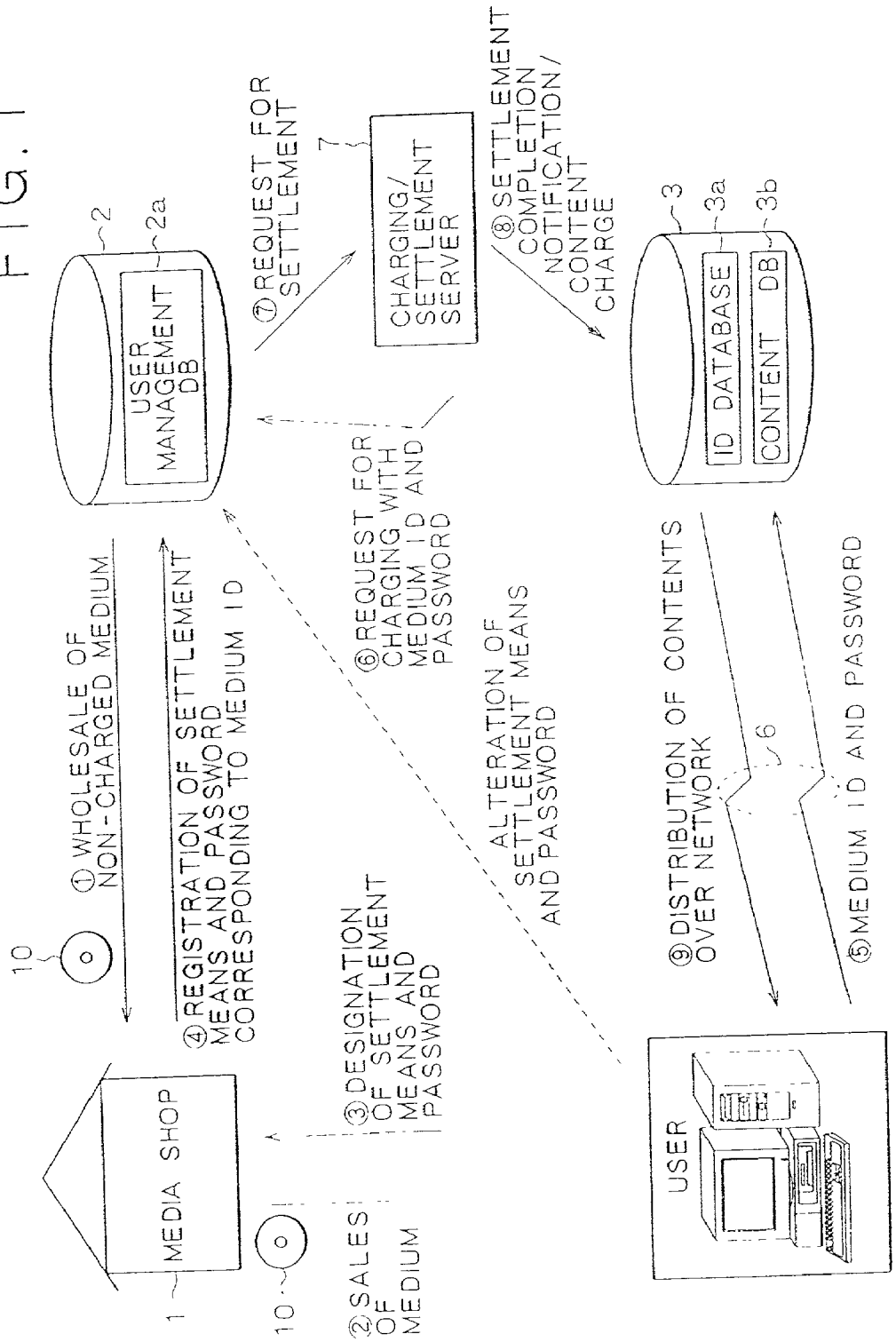
FIG. 1 is a diagrammatic view illustrating an example of a configuration of a downloading system for a non-charged medium to which the present invention is applied.

FIG. 1 illustrates a concept of a configuration of an entire downloading system ready for a non-charged medium to which the present invention is applied, and different components of the system and a procedure of administration and functioning operations of the system are described in order with reference to FIG. 1. It is to be noted that the following description proceeds with steps denoted by numerals surrounded by a circle from ① to ⑨ in FIG. 1.

Step 1: A medium server 2 is administrated by a medium company that manufactures, sells and provides media. The medium server 2 (medium company) manufactures a medium 10 to which the present invention is applied and wholesales the medium 10 to a media shop 1.

The medium 10 is manufactured such that a program for allowing content data to be downloaded from a particular server over a network, a program for decoding and managing enciphered content data and a unique medium ID different from that of any other medium are recorded in advance thereon as hereinafter described. In other words, the medium to which the present invention is applied is sold in such a form that at least a program (hereinafter referred to as download program) that describes a procedure for downloading (including recording and playback of download data) and an ID for specifying the medium are recorded. Further, the information of the download program and the ID is managed or recorded such that it cannot be altered, for example, by rewriting or the like at all.

Step 2: A user will purchase the medium 10 sold by the media shop 1. It is to be noted that, if the medium 10 is a non-charged medium as in the present case, the medium 10 itself may be sold free of charge.

Step 3: When the user purchases the medium 10, the user will designate a settlement means for a charged amount of money for downloading of content data. For example, the user may designate a credit card number or an account number for payment of the price. Thereupon, also a password for the medium will be designated. The password can be used, for example, for such an authentication process as hereinafter described. For example, if the user does not input an appropriate password upon downloading, then the downloading does not proceed. Therefore, a countermeasure against possible theft or loss of the medium can be taken rapidly and simply.

It is to be noted that it is preferable for the convenience to the user that the settlement means and the password can be altered by a procedure by the user that utilizes predetermined means.

Step 4: The information of the settlement means and the password designated in such a manner as described above are transmitted together with the medium ID recorded on the medium 10 purchased by the user from the media shop 1 to the medium server 2, for example, over a predetermined communication network 6. The medium server 2 stores the medium ID, the designated settlement means and the password transmitted thereto in a coordinated relationship to produce a user management database 2a.

It is to be noted that, although the communication network among the media shop 1, medium server 2 and a content server 3 which is described below is not a particularly limited one, for example, a telephone network, an ISDN, an ASDL, a cable television circuit, a portable telephone network, a WLL, a satellite circuit, an optical fiber communication network or the Internet may be employed as the communication network.

Step 5: The user who purchases the medium 10 possesses, for example, user terminal equipment 5.

For the user terminal equipment 5, any apparatus can be used only if it can record, for example, a purchased medium and can be connected to a content server over a predetermined communication network in such a manner as hereinafter described to effect downloading. Here, it is assumed that the user terminal equipment 5 is a personal computer.

Then, the user will load the purchased medium 10 into the user terminal equipment 5. Consequently, the user terminal equipment 5 executes a process in accordance with the download program recorded already on the medium 10 to automatically access the content server 3.

The content server 3 has an ID database 3a and a content database 3b stored therein. The ID database 3a stores, for example, information of different types of recording media corresponding to medium IDs. The content database 3b stores content data that can be uploaded.

Upon accessing by the user terminal equipment 5, the user terminal equipment 5 transmits the medium ID. The content server 3 receives the medium ID and refers to the ID database 3a to identify, for example, the type of the medium on which the medium ID is stored. Then, the content server 3 transmits a list of content data selected in accordance with the identified type of the medium.

While content data may include data of various types such as, for example, tune data, video data, game software, movie software and various application software which can be used by a personal computer or a like equipment, if the medium in question is of the type which has a format for recording only digital audio data, then since it is considered insignificant to provide content data other than, for example, tune data, the content server 3 transmits a list of tune data from among such various types of contents as mentioned above.

It is to be noted that, upon such accessing, for example, a password is transmitted together with the medium ID. The information of the password is utilized in a charge requesting process that is performed for the medium server 2 by the content server 3 as hereinafter described.

The user terminal equipment 5 receives the content data list and outputs it as a display image. For example, the user terminal equipment 5 displays information of content data names that can be downloaded, artist (producer) names and use limitations, prices of the content data and so forth as a list on a screen of the contents list.

The user will select favorable content data from among the displayed list and issue a request for downloading the favorable content data.

Step 6: The content server 3 receives the downloading request and issues a charging request by transmitting the medium ID and the password received formerly to the medium server 2.

Step 7: The medium server 2 refers to the received medium ID and password and the user management database 2a to execute, for example, an authentication process and issues, if the authentication is satisfied, a request for settlement to a charging/settlement server 7. The charging/settlement server 7 is administrated, for example, by a bank or a credit card company.

Step 8: If the settlement process is performed regularly with the charging/settlement server 7, then a notification of this is transmitted from the charging/settlement server 7 to the content server 3. Then, in a predetermined opportunity, the charge as a consideration for the downloaded data is paid to the administration side of the content server 3.

Step 9: The content server 3 receives the notification that the settlement is completed and transmits the content data over the communication network 6. The user terminal equipment 5 receives the content data and records the received content data onto the medium 10 currently loaded therein. In other words, downloading of the tune data is performed.

The content data are divided, for example, in regard to setting of the copyright, into two types including a type of data to which some playback limitation in regard to the number of times of playback or the term of playback is applied and another type of data to which no such playback limitation is applied. Downloading operation, a playback form and so forth that are different in accordance with such playback limitations to content data are hereinabove described.

1-2. User Terminal Equipment

Figure 2:
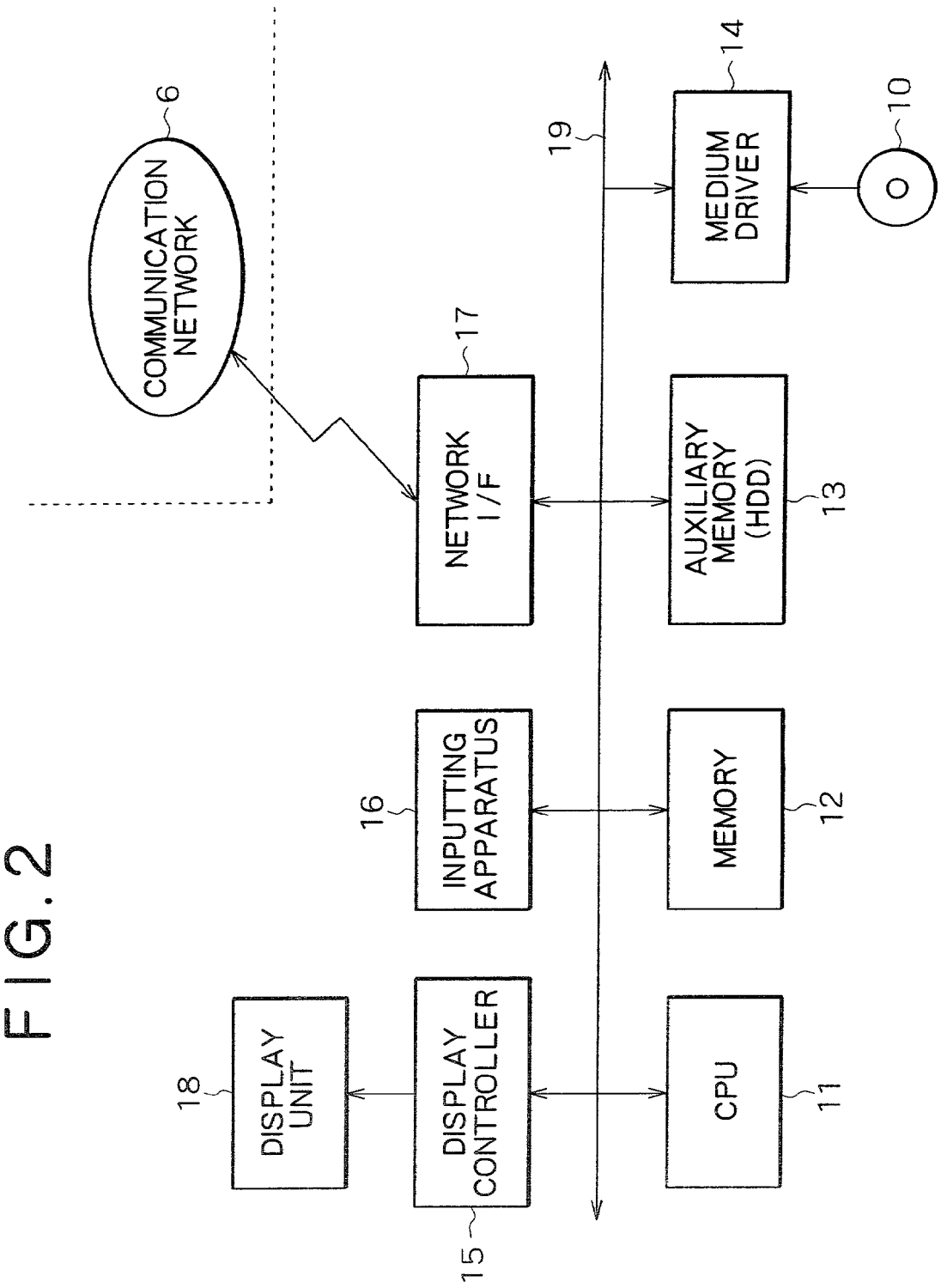
FIG. 2 is a block diagram showing an example of an internal configuration of user terminal equipment to which the present invention is applied.

FIG. 2 shows an example of an internal configuration of the user terminal equipment 5 described hereinabove with reference to FIG. 1. It is to be noted that FIG. 2 shows a configuration where the user terminal equipment 5 is a personal computer.

Referring to FIG. 2, a CPU 11 executes various processes, for example, in accordance with a program stored in a memory 12.

An auxiliary memory 13 includes, for example, a hard disk (HDD) that can store a comparatively great amount of data. The CPU 11 can access the auxiliary memory 13 over an internal bus 19 to write or read out data, a program or the like onto or from the hard disk of the auxiliary memory 13.

A medium driver 14 is compatible with a particular type of a medium and executes readout/writing of data from/into a compatible medium. It is assumed that the medium driver 14 in this instance is configured so as to allow recording/playback onto/from the medium 10.

A network interface (I/F) 17 is provided for communication over the communication network 6 and may be a modem as hardware if, for example, a telephone circuit is utilized for connection to the Internet or may be an interface for an Ethernet or the like if a network is used for such connection.

Communication of the user terminal equipment 5 with the content server 3 is performed through the network interface 17. Thus, also content data transmitted to the user terminal equipment 5 are received and acquired through the network interface 17 and, for example, recorded onto the medium 10 loaded in the medium driver 14 under the control of the CPU 11.

A display controller 15 produces image information and controls a display unit 18 to display an image in accordance with the image information under the display control of the CPU 11.

The user terminal equipment 5 further includes an inputting apparatus 16 that in turn includes operation elements such as a mouse and a keyboard and an interface for transferring an operation signal generated from any of the operation elements upon operation of the same to the CPU 11 over the internal bus 19.

The internal bus 19 may be, for example, a PCI (Peripheral Component Interconnect) or a local bus and interconnects the various internal components of the user terminal equipment 5.

1-3. Disk Medium

An outline of downloading operation has been described hereinabove with reference to FIG. 1. Now, on the premise of the downloading operation described, a data structure of the medium 10 and a utilization form and so forth of the system where the medium 10 is a disk medium are described.

Figure 3:
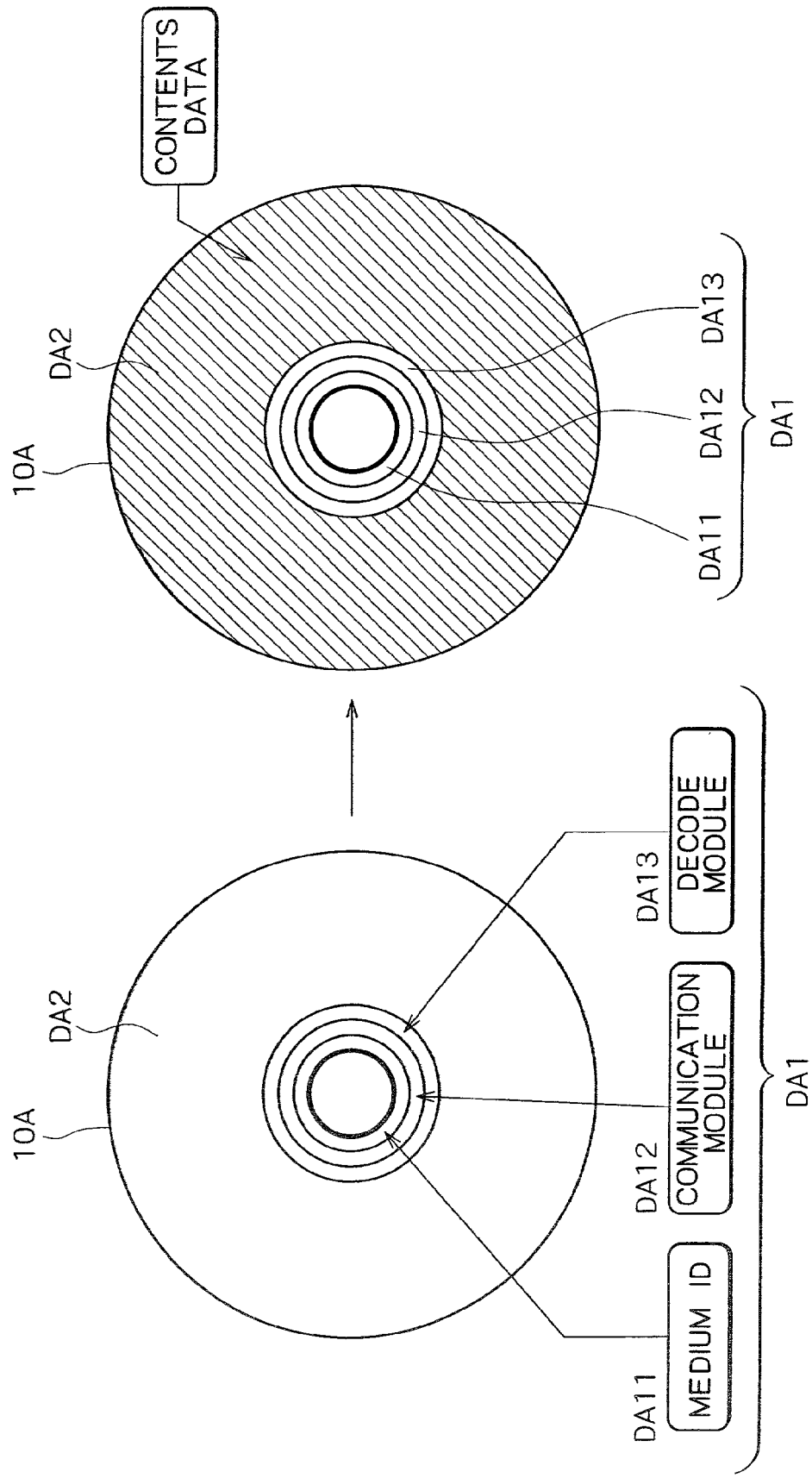
FIGS. 3A and 3B are schematic views showing an area structure of a disk medium to which the present invention is applied and illustrating recording and playback of content data when the content data have no playback limitation.

FIG. 3A illustrates a concept of a data area structure of a disk medium 10A. It is to be noted that, in the following description, the disk medium 10A is a CD-R (Compact Disk Recordable) or a CD-RW (Compact Disk Re-Writable) that is a recordable disk based on the CD format.

Referring to FIG. 3A, where a CD-R/RW is used as the disk medium 10A, a downloading data area DA1 into which data for downloading and a medium ID are recorded is formed on the innermost circumference side.

In the downloading data area DA1 in this instance, for example, as shown in FIG. 3A, a medium ID is recorded in an area DA11 on the innermost circumference side, and a communication module is recorded in another area DA12 on the outer circumference side while a decode module is recorded in a further area DA13 on the further outer circumference side. In this instance, a downloading program is formed from the communication module and the decode module. The communication module is a program that describes a communication procedure for allowing the user terminal equipment 5 to access the content server 3 and perform downloading. The decode module is a program for allowing the user terminal equipment 5 to execute, for example, a decipherment process of ciphered content data and a decompression process of compressed content data, and is executed in cooperation with the communication module when necessary.

In this instance, a data recording area DA2 for recording download data is formed on the outer circumference side of the downloading data area DA1. It is to be noted that, in FIG. 3A, the data recording area DA2 is in a blank state wherein no data is recorded therein.

In the user terminal equipment 5, if such a disk medium 10A as described above is loaded into the medium driver 14, then the medium ID, communication module and decode module recorded in the downloading data area DA1 are read out and developed into the memory 12.

Figure 8:
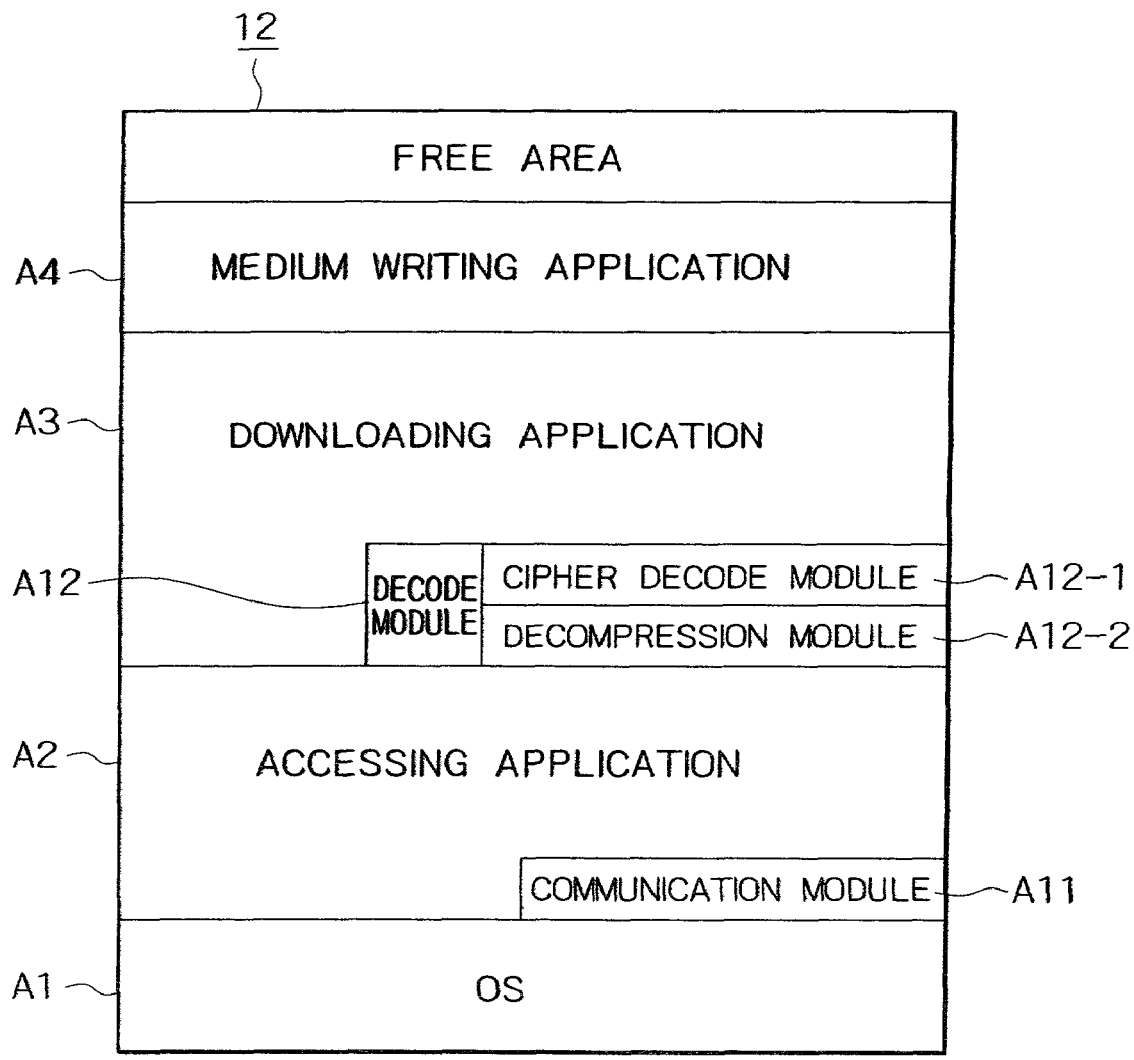
FIG. 8 is a diagrammatic view illustrating an example of memory mapping where program data recorded on a medium to which the present invention is applied are developed on a memory.

The concept of data mapping of the memory then is such as, for example, illustrated in FIG. 8.

Referring to FIG. 8, an area A1 in which an OS (Operating System) is stored is formed in the memory 12 first. Then, as application software that operates on the OS, an accessing application is developed from the auxiliary memory 13 into another area A2 in accordance with the program of the communication module. In other words, startup or activation is performed. The accessing application is executed in accordance with the procedure described in the communication module read out from the medium and stored in an area A11 to allow automatic accessing to the content server 3.

In the following area A3, the downloading application read out from the auxiliary memory 13 by the decode module is developed. The download application causes processing for downloading after accessing to the content server 3 to be automatically executed in accordance with the described contents of the communication module.

In an area A4 next to the area A3, the medium writing application read out from the auxiliary memory 13 is developed.

After the memory map described above is produced, the CPU 11 executes processing of the application in accordance with the download program read out from the medium to allow automatic execution of accessing to and downloading from the content server 3 in such a manner as described hereinabove with reference to FIG. 1.

Referring back to FIG. 3A, if downloading is executed in accordance with the download program read out from the medium, then the content data acquired by the downloading are recorded into the data recording area DA2 (refer to FIG. 3A), which has been in a blank state, as seen in FIG. 3B.

As described hereinabove with reference to FIG. 1, content data are classified into those that have some playback limitation and those which have no playback limitation. It is assumed that content data having some playback limitation are enciphered data. Further, content data are data compressed in accordance with a predetermined method so that they may be transmitted efficiently.

In order to record downloaded content data in such a manner as seen from FIGS. 3A and 3B, where the content data have no playback limitation, the user terminal equipment 5 performs decipherment and decompression for the received and acquired content data in accordance with the program of the decode module (cipher decode module and decompression module). Then, the user terminal equipment 5 decodes the thus decoded content data into the data recording area DA2 of the disk medium 10A.

Where the disk medium 10A is a CD-R/RW as described above, when the user terminal equipment 5 writes the content data into the data recording area DA2, it writes TOC (Table Of Contents) information so that the downloading data area DA1 recorded on the inner circumference of the disk medium 10A may represent the Index 0 of the first audio track in accordance with an existing format of the CD-I Ready. Consequently, the CD thus produced can be used also by an ordinary CD player so that the digital audio data thereon may be played back.

Meanwhile, where the disk medium 10A is a CD-RW, if the downloading data area DA1 is formed on an outer circumference of the disk and the data recording area DA2 is formed on the inner circumference side to the downloading data area DA1 and downloaded data are recorded into the data recording area DA2, then the disk medium 10A produced complies with the CD-Extra format.

On the other hand, if it is intended to record downloaded content data onto the disk medium 10A where the content data have some playback limitation, then the content data are recorded in such a manner as seen in FIGS. 4A and 4B. FIG. 4A shows a virgin medium similar to that shown in FIG. 3A. When content data having some playback limitation are downloaded, also limitation information in which information of a playback limitation condition to the content data is placed is transmitted together with the content data. Thus, upon recording, the limitation information is recorded into an area DA14 provided newly in the downloading data area DA1, for example, in such a manner as seen in FIG. 4B. Then, the content data are recorded into the data recording area DA2 in a similar manner as described hereinabove.

Then upon playback, playback processing is executed in accordance with contents of the limitation information.

For example, if the playback limitation is set in regard to the term, then the date at present and the date of the term of playback given by the limitation information are compared with each other, and if it is determined as a result of the comparison that playback of the content data is permissible, then the content data are deciphered and outputted.

On the other hand, where the content data have a limitation in the number of times of playback, the history of the number of times by which the content data have been played back and the playback permission time number as the limitation information are referred to, and if it is determined through the reference that playback of the content data is permissible, then the content data are deciphered and played back. It is to be noted that the history information of the number of times of playback may be recorded in an enciphered form together with the limitation information, for example, into the area DA14.

Playback management regarding such playback limitation is executed in accordance with the program of the decode module (cipher decode module and decompression module) recorded on the disk medium 10A.

While the foregoing description is based on the presumption that the disk medium 10A is a CD-R/RW, also various other disk media are well known in the art and the present invention can be applied also to such various other media. As other representative disk media, for example, a PD, a DVD-R, a DVD+RW, a DVD-RW, a DVD-RAM, an MO, an MD, a HiFD, an LS120, a Zip, a JAZZ, an MVDISK, an HS and a removable HDD are known.

Now, downloading where an MD (Mini Disc) having a format for recording compressed digital audio data onto a magneto-optical disk is used as the disk medium 10A is described.

Also where an MD is adopted as the disk medium, a medium ID and a download program (communication module and decode module) are recorded into the downloading data area DA1 formed, for example, on the inner circumference side as seen in FIG. 3A. Since the MD is a rewritable medium, for example, if details of the TOC recorded on the MD are defined in such a manner as well known in the art, then the downloading data area DA1 is treated as ROM tracks that cannot be physically rewritten.

If downloading is executed in accordance with the download program (communication module and decode module) recorded in such an MD as described above, then the list of contents transmitted from an accessed server is a list only of tunes of digital audio data compressed in accordance with the format for an MD.

When content data in the form of compressed digital audio data are received and recorded into the data recording area DA2 of an MD through execution of downloading, the content data are recorded in a substantially similar manner as that upon recording onto a CD-R/RW described above.

In particular, if the content data downloaded have no playback limitation, then they are deciphered upon downloading and recorded as ordinary audio tracks into a rewritable area on an outer circumference of the MD. The MD recorded in this manner can be treated as an MD having a format similar to that of an ordinary MD and therefore can be played back without any limitation by means of playback equipment ready for an MD.

On the other hand, where the content data downloaded have some playback limitation, they are recorded onto an MD while they remain in an enciphered form. Then upon playback, the playback limitation is confirmed in accordance with the program of the decode module, and if playback of the content data is permissible, then the content data are deciphered, played back and outputted.

Description is given also of downloading where a disk such as a DVD-RAM, a DVD+RW, a DVD-RW or an MVDISK is adopted as the disk medium 10A.

Such disk media as just mentioned have such a great storage capacity as, as things stand, 4.7 GB with one face thereof where they have a format for a DVD while, for example, a CD-R/RW has a storage capacity of approximately 630 MB. Accordingly, for example, moving picture data for a long time can be recorded onto the disk media. Therefore, where such a great storage capacity is used as the disk medium 10A, the content data for the disk medium 10A may be video software of moving pictures of a movie or a promotion video.

Also where such great storage capacity disks are used, for example, the downloading data area DA1 is formed in such a manner as seen in FIG. 3A and a medium ID and a download program (communication module and decode module) are recorded into the downloading data area DA1. Then, the content data are recorded and played back in a similar manner as described hereinabove with reference to FIGS. 3A, 3B, 4A and 4B except that the content data include, for example, a video source composed of moving picture data.

1-4. Memory Device Medium

In recent years, various apparatus that incorporate a memory device as a storage medium have been and are being popularized, and digital audio data or still image data are often recorded into a storage medium in the form of a memory device. Also a storage medium in the form of a memory device can be used as the medium 10.

Figure 5:
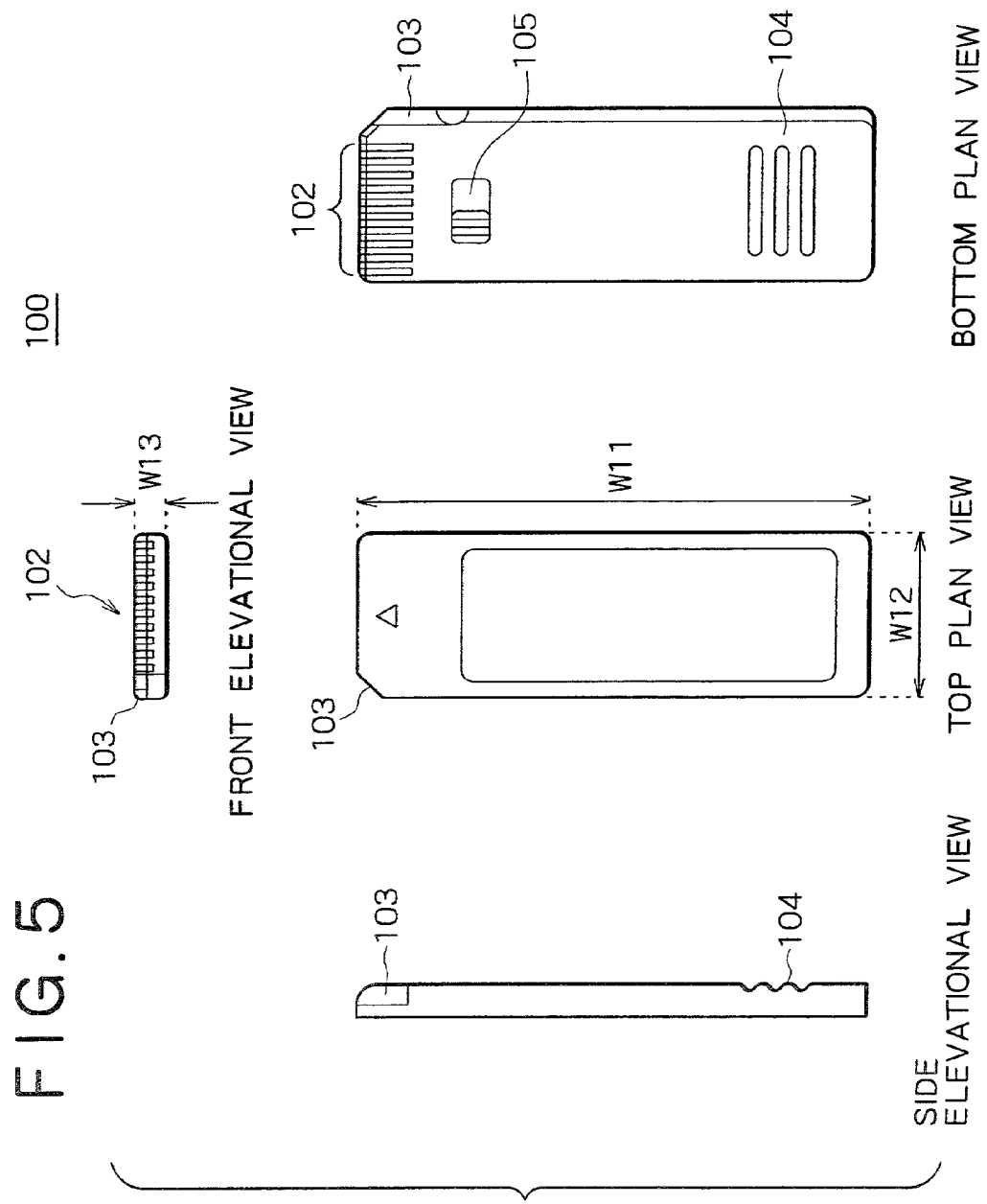
FIG. 5 is a top plan view, a front elevational view, a side elevational view and a bottom plan view showing an outer profile of a plate-shaped memory which can be utilized as a medium to which the present invention is applied.

FIG. 5 shows an appearance of a plate-shaped memory proposed by the assignee of the present invention as a medium including such a memory device as described above.

Referring to FIG. 5, the plate-shaped memory 100 shown includes a memory device, for example, of a predetermined storage capacity accommodated, for example, in such a plate-shaped housing as seen in FIG. 5. A flash memory may be provided as the memory device.

The housing whose top plan view, front elevational view, side elevational view and bottom plan view are shown in FIG. 5 is formed, for example, by molding of a plastic material and may have such a size of dimensions W11, W12 and W13 as seen in FIG. 5 wherein particularly W11 is 60 mm, W12 is 20 mm and W13 is 2.8 mm.

A terminal section 102 having, for example, 10 electrodes is formed on a portion of the housing from a lower portion of the front face to the bottom face side so that reading out and writing operations from and into the memory device in the housing may be performed through the terminal section 102.

A cutaway portion 103 is provided at the left upper corner of the housing in the top plan view. The cutaway portion 103 is provided so that the plate-shaped memory 100 may be loaded in a correct direction, for example, into a loading mechanism of the body of a drive apparatus.

A rough or uneven portion 104 is formed on the bottom face of the housing in order to prevent the medium 10 from inadvertently slipping down from a hand or the like thereby to assure facility in use.

Further, a slide switch 105 for preventing wrong or inadvertent erasure of storage contents is provided on the bottom face of the housing.

The storage capacity of the flash memory of the plate-shaped memory 100 is prescribed to be one of 4 MB (megabytes), 8 MB, 16 MB, 32 MB, 64 MB and 128 MB.

Further, the FAT (File Application Table) system is used as a file system for data recording/playback.

Figure 6:
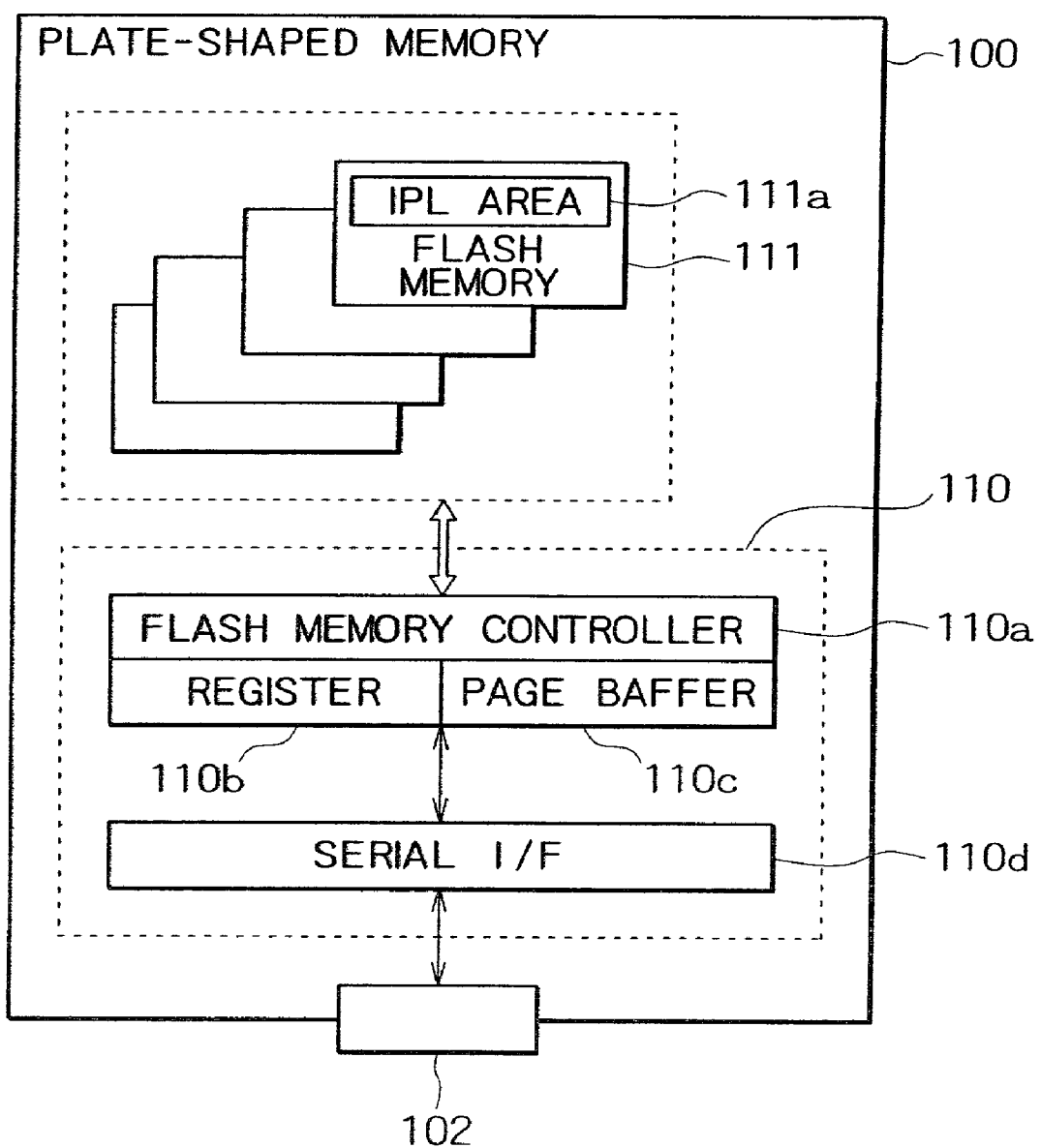
FIG. 6 is a block diagram showing an example of an internal configuration of the plate-shaped memory of FIG. 5.

The plate-shaped memory 100 has, for example, such an internal circuit configuration as shown in FIG. 6. A serial interface system configuration between the media shop 1 and the driver 14 that is hereinafter described is described.

The internal circuit of the plate-shaped memory 100 includes a control IC 110 and a flash memory 111. The control IC 110 executes writing and reading out operations into and from the CPU 11.

The control IC 110 includes blocks serving as a flash memory controller 110a, a register 110b, a page buffer 110c, and a serial interface 110d.

The flash memory controller 110a transfers data between the flash memory 111 and the page buffer 110c based on parameters set in the register 110b.

Data buffered in the page buffer 110c are transferred to the medium driver 14 (refer to FIG. 2), which has, for example, a configuration suitable for the plate-shaped memory 100, through the serial interface 110d. On the other hand, data transferred from the medium driver 14 to the plate-shaped memory 100 are buffered into the page buffer 110c through the serial interface 110d.

Operation of the user terminal equipment 5 shown in FIG. 2 where the medium driver 14 is configured such that it can read out/write data from/into a plate-shaped memory is described supplementally.

Figure 7:
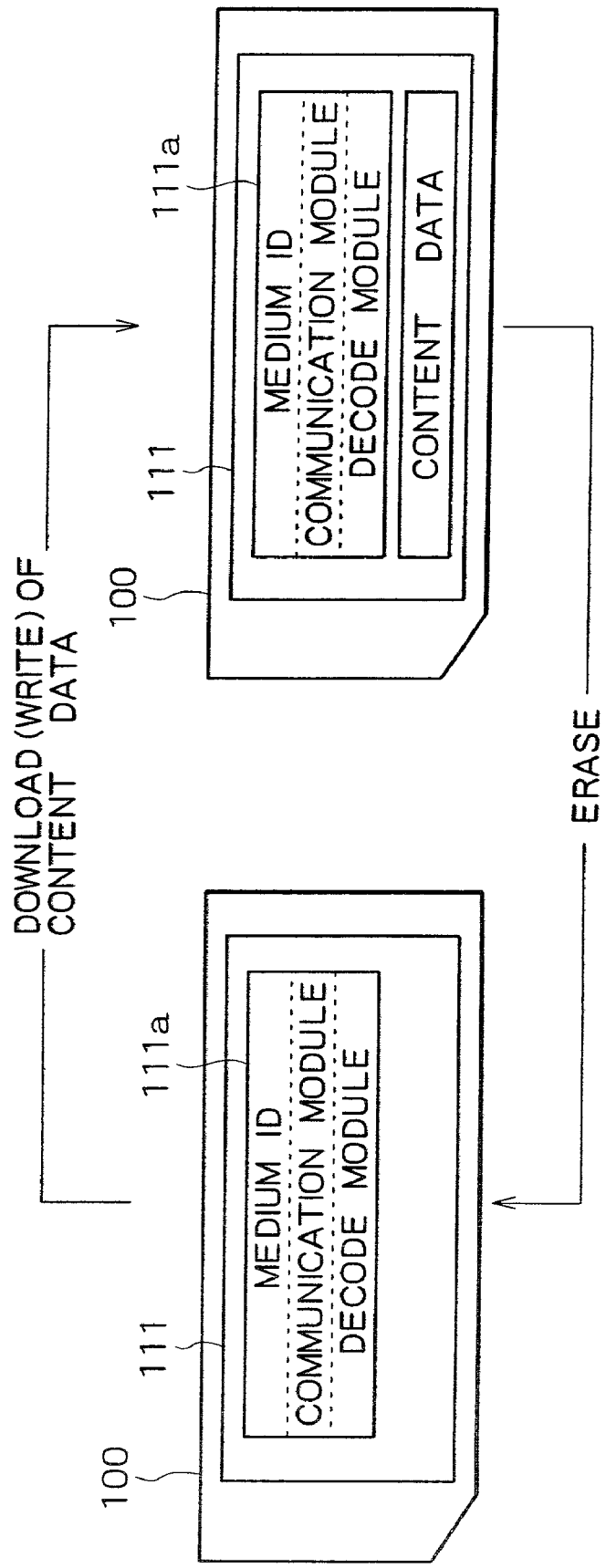
FIGS. 7A and 7B are diagrammatic views illustrating recording/playback of content data where the plate-shaped memory of FIG. 5 is used when the content data have no playback limitation.

The CPU 11 controls the medium driver 14 to execute readout of a management file for management of a main data file stored in the plate-shaped memory 100 to form a file manager. Accessing of the plate-shaped memory 100 to the control IC 110 is executed in accordance with the file manager. As a result, readout accessing/writing accessing to the flash memory 111 in the plate-shaped memory 100 is realized.

Where the plate-shaped memory 100 having such a configuration as described above is used as the medium 10, it is defined such that an IPL (Initial Program Loader) area 111a which is a non-rewritable area is provided, for example, in a predetermined region of the flash memory 111 as seen in FIG. 6. Thus, a medium ID and a download program (communication module and decode module) are stored in advance in such a manner as illustrated in FIG. 7A in the flash memory 111.

In this instance, content data acquired by downloading are written and stored into the flash memory 111 in accordance with the download program stored in the IPL area 111a.

On the other hand, if content data having no playback limitation are stored, then the data can be played back by a personal computer, a portable audio player or the like which includes, for example, a medium driver ready for the plate-shaped memory 100.

When content data having some playback limitation are to be stored, they are stored, for example, while they remain in the form of ciphered data in a manner similar to that described hereinabove with reference to FIGS. 4A and 4B. Also the limitation information is stored in the IPL area 111a. Upon playback, a playback limitation operation is performed based on the limitation information.

1-5. Processing Operation

Figure 9:
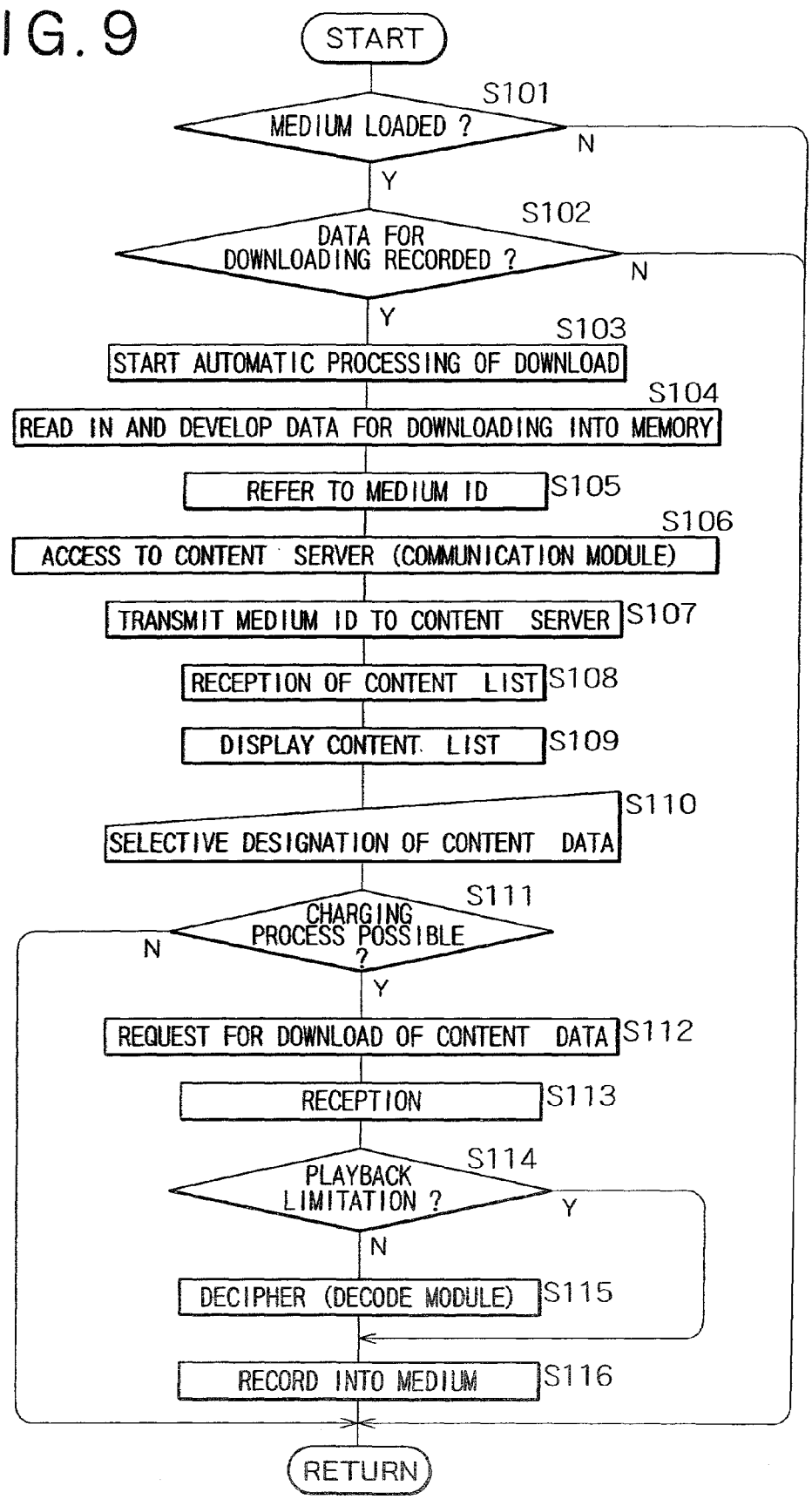
FIG. 9 is a flow chart illustrating a processing procedure for performing downloading operation of the downloading system of FIG. 1.

In order to realize the downloading operation described above, processing operation executed, for example, by the CPU 11 of the user terminal equipment 5 is described with reference to FIG. 9.

First in step S101, the CPU 11 waits that a medium 10 is loaded into the medium driver 14. If the CPU 11 determines that a medium 10 is loaded, then the processing advances to step S102.

In step S102, the CPU 11 determines whether or not data for downloading are recorded in a predetermined region in the medium 10 thus loaded. To this end, the CPU 11 refers to management information, a file of the FAT and so forth recorded on the medium and determine information about presence or absence of the data for downloading (a medium ID and a download program (communication module and decode module)) described in the management file or the FAT file. Alternatively, the CPU 11 may try to read out a region of the medium 10 defined as the downloading data area A1 and determine whether or not the contents of a predetermined data portion read out then are the data for downloading.

If a negative result is obtained in step S102, then since the medium 10 is an ordinary medium on which the data for downloading are not recorded, the routine for the automatic downloading processing is quitted, and another required routine is entered.

On the other hand, if an affirmative result is obtained in step S102, then the processing advances to a process for execution of automatic downloading in steps S103 and later.

In step S103, the CPU 11 establishes a mode in which automatic processing for downloading can be started. Then in next step S104, the CPU 11 reads in the data for downloading stored in the medium 10 and develops the data in the memory 12. Consequently, such a mapped state as described hereinabove with reference to FIG. 9 is obtained.

Then in next step S105, the CPU 11 refers to the medium ID stored in the medium 10. Then in step S106, the CPU 11 accesses the content server, and then in next step S107, the CPU 11 transmits the medium ID to the content server. In this instance, if necessary, also a password is transmitted in such a manner as described hereinabove.

In response to the medium ID transmitted in this manner, the content server 3 acquires a list of content data restricted based on the medium ID and transmits the list of content data as a predetermined multimedia file of predetermined standards.

The multimedia file of the content data list transmitted in such a manner as described above is received in step S108 by the user terminal equipment 5. Then in next step S109, the CPU 11 controls the display unit 18 to display the content data list received and acquired in this manner.

While the user observes the display, the user can operate an operation element of the inputting apparatus 16 to select desired content data from within the content data list. Processing for selective designation of content data in accordance with the selection operation is executed in next step S110.

In this instance, such a cumbersome operation as, for example, designation of a settlement method as in the prior art need not be performed because registration of a credit card number for settlement of a charge and so forth was performed by the user when the medium 10 was purchased and the information is managed together with the medium ID by the server side.

Then in next step S111, the CPU 11 determines whether or not a charging process for the content data selected by the user is possible. This can be determined by the user terminal equipment 5 side based on notification information regarding whether or not the charging and settlement in the steps 6 to 8 described hereinabove with reference to FIG. 1 have been completed normally.

Usually, a notification that the charging process is possible is received. However, another notification that the settlement is impossible on the server side may sometimes be received because, for example, the credit card number registered by the user has become invalid. In such an instance, a negative result is obtained in step S111, and later processing for downloading is interrupted and this routine is quitted.

On the other hand, if an affirmative result is obtained in step S111, then the processing advances to step S112.

In step S112, the CPU 11 executes a process to issue a request for downloading of the selectively designated content data from the user terminal equipment 5 to the content server 3.

In response to the request, the content server 3 searches for the selectively designated content data from within the content database 3b and transmits thus searched out content data to the user terminal equipment 5.

The user terminal equipment 5 receives the content data transmitted thereto in step S113. It is to be noted that, where the content data have some playback limitation, since the limitation information is transmitted together with the content data, the user terminal equipment 5 receives the limitation information as well.

Then in step S114, the CPU 11 determines whether or not the received and acquired content data have some playback limitation. This discrimination can be based on presence or absence of such limitation information transmitted in such a manner as described above.

If an affirmative result that the content data have some playback limitation is obtained in step S114, then the processing advances to step S116 directly. This is intended, where the received and acquired content data have some playback limitation, decipherment be not performed as described, for example, with reference to FIG. 4. On the other hand, where a negative result that the content data have no playback limitation is obtained in step S114, then the processing advances to step S116 after decipherment of the ciphered content data is performed in step S115.

In step S116, the CPU 11 executes control processing for recording the received and acquired content data onto the medium 10.

In the foregoing description, limitation information is recorded onto the medium 10, and upon playback, playback limitation is performed based on the playback limitation information recorded on the medium 10. However, playback limitation may otherwise be performed in the following manner.

In particular, for example, the content server 3 or the medium server 2 stores and manages a medium ID and limitation information in the content database 3b or the user management database 2a. When content data having some playback limitation are to be played back, the communication module recorded on the medium 10 is started up every time to automatically establish a connection to the content server 3 and refer to the details of the limitation information managed by the content server 3 side. Then, the user terminal equipment 5 side executes a playback limitation operation based on the details of the limitation information thus referred to.

Where the playback limitation is performed in this manner, also the limitation information is managed in a centralized manner together with the other information such as the medium ID by the server side. Accordingly, the limitation information need not be stored any more onto the medium 10, and therefore, otherwise possible illegal alteration of the limitation information can be prevented almost with certainty. Also it is possible to save the storage capacity of the medium 10.

Figure 10:
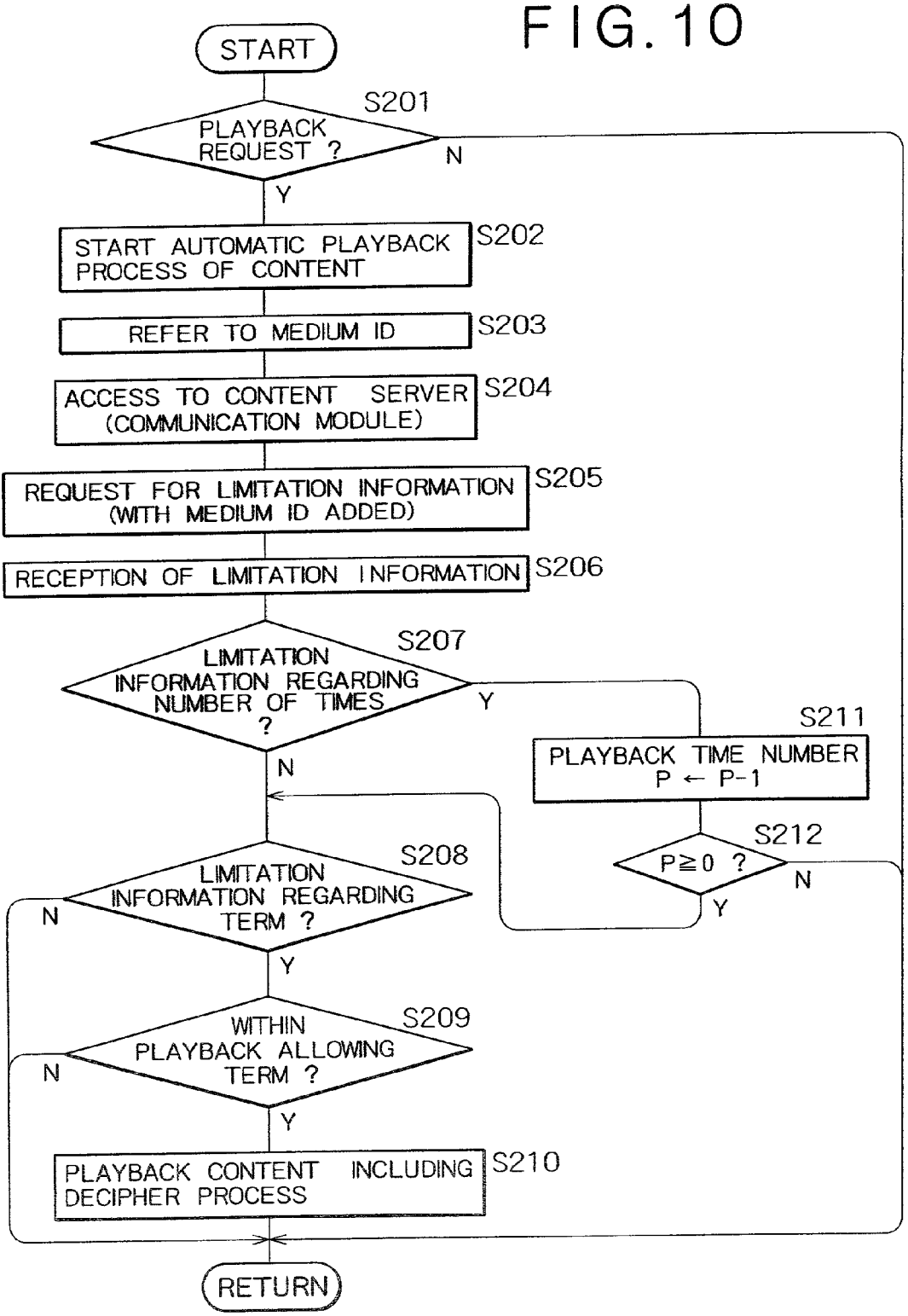
FIG. 10 is a flow chart illustrating processing operation of the downloading system of FIG. 1 when content data recorded on a medium to which the present invention is applied are played back.

Processing operation for realizing playback operation of the medium 10 where various kinds of information including limitation information are managed in a centralized manner as described above is illustrated in FIG. 10. In this instance, it is assumed that, when the processing illustrated in FIG. 10 is executed, the medium 10 is loaded in the medium driver 14. Also the processing illustrated in FIG. 10 is executed by the CPU 11 of the user terminal equipment 5.

First in step S201, the CPU 11 waits for issuance of a playback request. Then, if it is determined that a playback request is issued as a result of a playback operation performed, for example, for the inputting apparatus 16, then the processing of the CPU 11 advances to step S202.

In step S202, the CPU 11 starts an automatic contents playback process. In this instance, for example, the CPU 11 reads out a medium ID and a download program (communication module and decode module) recorded in the downloading data area DA1 of the medium 10 and develops them in the memory 12.

Then, for example, in next step S203, the CPU 11 refers to the medium ID stored in the memory 12. The value of the medium ID referred to here is utilized, for example, upon information transmission of a content server hereinafter described.

In next step S204, the CPU 11 utilizes the communication module to access the content server 3. Then in step S205, the CPU 11 issues a limitation information request with the medium ID added thereto to the content server 3 accessed in step S205.

The content server 3 receives the limitation information request and searches for the limitation information coordinated with the medium ID transmitted together from within the ID database 3a. Then, the content server 3 transmits the searched out limitation information to the user terminal equipment 5. The user terminal equipment 5 receives the limitation information transmitted thereto in this manner in step S206.

The limitation information here can be classified, in terms of the manner of limitation, into time number limitation information for providing a limitation to the number of times of playback and term limitation information for providing a limitation to the term of playback. Therefore, the details of the limitation information may include only the time number limitation information, or only the term limitation information or else a combination of the time number limitation information and the term limitation information.

Then in step S207, the CPU 11 determines whether or not the details of the received limitation information include time number limitation information. If an affirmative result is obtained in step S207, then the processing advances to step S211.

In step S211, the permissible playback time number P represented by the time number limitation information is decremented to P←P−1, and in next step S212, the CPU 11 determines whether or not the permissible playback time number P at present is equal to or greater than 0. If a negative result is obtained in step S212, then since it is managed that the content data have already been played back by the permissible playback time number, the later processing for playback is skipped and the processing quits the present processing routine. On the other hand, if a positive result is obtained in step S212, then this signifies that the content data have not yet been played back by the permissible playback time number and therefore can still be played back. In this instance, the processing advances to step S210.

On the other hand, if a negative result that the limitation information does not include time number limitation information is obtained in step S207, then the processing advances to step S208, in which the CPU 11 determines whether or not the limitation information includes term limitation information.

If a negative result is obtained in step S208, then this signifies that none of time number limitation information and term limitation information is included in the limitation information. In this instance, the limitation information may not possibly be limitation information that can be processed by the user terminal equipment 5. In such an instance, since playback of the content data may not be appropriate for protection of the copyright, the present processing routine is quitted without execution of the later playback process.

On the other hand, if an affirmative result is obtained in step S208, then the processing advances to step S209, in which the CPU 11 compares the playback term date represented as the term limitation information and the present date with each other to determine whether or not the present time is within the playback term. It is to be noted that the comparison between the playback term date and the present date may otherwise be performed on the server side while the term limitation information represents whether or not playback is permissible based on the permissible playback term.

If a negative result that the present date is not within the permissible playback term is obtained in step S209, then since playback of the content data should be inhibited, the processing illustrated in FIG. 10 is quitted without playing back the content data. On the other hand, if an affirmative result is obtained in step S209, then the processing advances to step S210.

Figure 4:
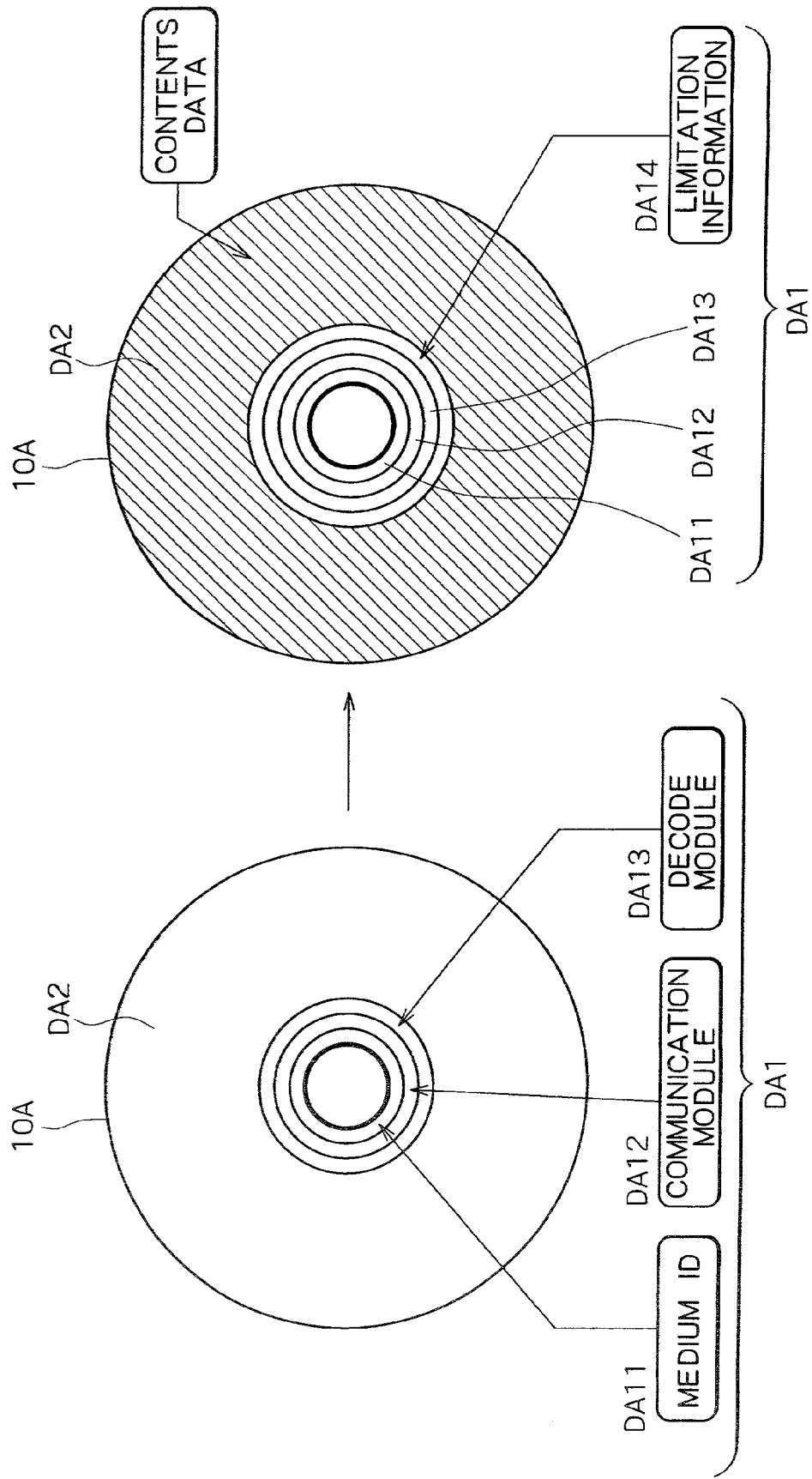
FIGS. 4A and 4B are schematic views showing another area structure of a disk medium to which the present invention is applied and illustrating recording and playback of content data when the content data have playback limitation.

In step S210, the CPU 11 executes control processing to execute decipherment processing for the ciphered content data to play back and output the content data as described hereinabove with reference to FIG. 4. It is to be noted that the processing, for example, in steps S205 to S210 is executed by the CPU 11 principally in accordance with the program of the decode module.

It is to be noted that, while the downloaded content data in the foregoing description are recorded onto the medium 10, they may otherwise be recorded not onto the medium 10 but onto the auxiliary memory 13.

In this instance, identification information representing that the content data stored in the auxiliary memory 13 are data that should originally be recorded onto the medium 10 is added to the content data. Then upon playback, content data having such identification information are played back in accordance with the download program stored in the medium 10. This allows management in a manner similar to that described hereinabove.

2. System for Charged Medium

Subsequently, a system for a "charged medium" is described.

FIG. 11 shows an example of a configuration of a downloading system for a charged medium. Referring to FIG. 11, the downloading system is similar in configuration to but is different from the downloading system described hereinabove with reference to FIG. 1 in that it does not require the charging/settlement server 7. In the following, description is given principally of differences in procedure of operation of the downloading system from that of the downloading system of FIG. 1.

Step 1: Also in this instance, the medium server 2 (medium company) manufactures a medium 10 to which the present invention is applied and wholesales the medium 10 to the media shop 1. The medium 10 has a data area structure, for example, same as that described hereinabove with reference to FIG. 3A.

Step 2: The media shop 1 sells the medium 10.

Step 3: Before a user purchases a medium sold by the media shop 1, it can designate a contents supply source and select a playback limitation or limitations (playback time number, playback term, no limitation and so forth).

Step 4: The user will purchase a medium after such designation and selection are performed.

In this instance, the price to be paid for the medium is determined to be, for example, an amount of money of the sum total of the price of the medium itself (which may be zero, that is, the medium itself may be free) and an amount of money corresponding to a download charge set on the presumption that data be downloaded onto the medium. In this instance, the download charge may be set, for example, to a fixed amount of money or may otherwise be set taking the contents registered in step 3 above into consideration.

Step 5: After the user purchases the medium 10, the media shop 1 transmits the information of the contents supply source and the playback limitation designated or selected in step 2 described above together with the medium ID of the medium purchased by the user to the medium server 2 so that the information may be registered.

The medium server 2 places the medium ID, designated settlement means and password transmitted thereto in a coordinated relationship to produce a user management database 2a.

Step 6: The medium server 2 notifies the content server 3, for example, of the fact that contents charge has been paid in advance together with the details of the information about the user management database 2a coordinated with the medium ID of the medium 10 purchased now. The content server 3 produces an ID database 3a in response to the notification. The ID database 3a thus stores the information of the designated contents supply source and playback limitation and so forth in a coordinated relationship with the medium ID.

Step 7: Also in this instance, when the user loads the purchased medium 10 into the user terminal equipment 5, the user terminal equipment 5 executes processing in accordance with the download program recorded already on the medium 10 to automatically access the content server 3. In this instance, the medium ID read out from the loaded medium 10 is transmitted.

Step 8: The content server 3 thus accessed transmits the medium ID received thereupon to the medium server 2.

Step 9: The medium server 2 refers to the information coordinated with the medium ID received from the user management database 2a to perform an authentication process. Then, if the medium server 2 confirms that the medium 10 having the medium ID has been sold with payment of the download charge therefor, then it notifies the content server 3 of permission of utilization of the content data.

Step 10: The content server 3 confirms that the content utilization has been permitted and thereafter executes a process for allowing the content data to be downloaded.

In particular, the content server 3 refers, for example, to the ID database 3a to identify the type of the medium on which the medium ID is stored in a similar manner as in the downloading system of FIG. 1. Further, in this instance, the content server 3 identifies the contents supply source and playback limitation designated and registered in steps 3 and 5 described above.

Then, the content server 3 transmits a list of content data selected from within the content database 3b in response to the identified contents of the information.

In particular, first, selection of, for example, audio data or video data as a type of content data is performed based on the identified type of the medium. In this instance, also selection regarding a compression format suitable for the type of the medium is performed. On the other hand, based on the identified contents supply source, for example, content data distributed by a record company or a label corresponding to the designated content supply source are selected.

Here, if content data to be placed into a list are restricted, for example, based on the content supply source (record company or label) designated by the user in prior in such a manner as described above, then since content data which are not necessary to the user are not listed, the user can select content data with a higher degree of efficiency. Also it is possible to make it possible, for example, upon designation of a content supply source upon purchase, to selectively designate a particular artist. In this instance, a list of content data only of the particular artist can be transmitted.

Traditionally, profits of charges based on the copyright included in the price of recordable media are substantially uniform among pertaining record companies, artists and so forth. According to the downloading system, however, since a label and/or an artist are designated, for example, upon purchase and the download charge to be included in the medium 10 is determined, the profits of the download charge can be paid appropriately to each pertaining record company and artist.

Then, a list of the contents selected in such a manner as described above is transmitted to the user terminal equipment 5. The user terminal equipment 5 receives the content list and outputs a display output regarding the content list, and the user will select desired content from within the contents list and issue a download request for the content data.

Step 6: The content server 3 receives the download request, selects the request content data from within the content database 3b and transmits the content data over the communication network 6. Thereupon, the content server 3 transmits also limitation information corresponding to the playback limitation registered by the user upon purchase of the medium. The user terminal equipment 5 receives the content data and records the content data and the limitation information into the medium 10 currently loaded therein.

Medium types and data area structures which can be applied to the medium 10 of the system ready for such a charged medium, and compliant writing of download data, playback of the medium 10 (including a playback operation in accordance with limitation information) and so forth are substantially similar to those described hereinabove with reference to FIGS. 3A to 8.

In the system configuration shown in FIG. 11, preferably a user can conclude a contract, for example, with the medium server 2 by suitable means and pay a charge for additional purchase of content data. The medium server 2 receiving the proposal for the additional purchase pays the contents charge for the additional purchase to the content server 3 in a similar manner as in step 6 described hereinabove.

FIG. 12 illustrates processing operation to be executed by the CPU 11 to have content data to be downloaded to the user terminal equipment 5 in the system ready for a charged medium described above.

Referring to FIG. 12, processing in steps S301 to S315 is substantially similar to that in steps S101 to S116 described hereinabove with reference to FIG. 9. It is to be noted, however, that, since, in the present case, the download charge was paid already upon purchase of the medium, the determination processing (step S111) executed in the process of FIG. 9 regarding whether or not a charging process is possible is eliminated.

In recent years, communication terminal equipment connected to various servers is provided in such a place as, for example, a convenience store or entertainment equipment such that, when a user utilizes the communication terminal equipment, it can enjoy various services such as, for example, sales (downloading) of audio data or game software.

Thus, such communication terminal equipment as just mentioned may be used, for example, as or in place of the user terminal equipment 5 described hereinabove with reference to FIG. 1 or 11.

On the other hand, where the user terminal equipment 5 is owned and used in a home by a user, it may possibly be an apparatus other than a personal computer. For example, the user terminal equipment 5 may be incorporated in a downloading apparatus wherein a medium driver to which the present invention is applied is provided in or connected to an equipment called set top box for receiving and enjoying a satellite broadcast or a broadcast over a predetermined communication network.

Further, the medium server 2 or the content server 3 may hold a download history for each user (medium ID) such that it may prepare a list of content data for the user, for example, in conformity with the taste or the tendency of the user based on the download history. Further, if an accounting history (charge payment history) is additionally managed, then finer user management can be anticipated.

It is to be noted that the present invention is not limited to the configurations described above and allows various modifications. For example, the downloading process, playback process and so forth in accordance with a download program recorded on the medium 10 may be modified suitably.

While preferred embodiments of the present invention have been described using specific terms, such description is for illustrative purpose only, and it is to be understood that changes and variations may be made without departing from the spirit or scope of the following claims.

In the drawings:
FIG. 1
1 . . . Media shop
2 . . . Medium server
2a . . . User management DB
Between 2a and 5 . . . Alteration of settlement means and password
3 . . . Contents server
3a . . . ID database
3b . . . Contents DB
5 . . . User terminal equipment
In 5 . . . User
6 . . . Communication network
7 . . . Charging/settlement server
①. . . Wholesale of non-charged medium
②. . . Sales of medium
③. . . Designation of settlement means and password
④. . . Registration of settlement means and password corresponding to medium ID
⑤. . . Medium ID and password
⑥. . . Request for charging with medium ID and password
⑦. . . Request for settlement
⑧. . . Settlement completion notification/contents charge
⑨. . . Distribution of contents over network
FIG. 2
6 . . . Communication network
12 . . . Memory
13 . . . Auxiliary memory (HDD)
14 . . . Medium driver
15 . . . Display controller
16 . . . Inputting apparatus
17 . . . Network I/F
18 . . . Display unit
FIG. 3A
DA11 . . . Medium ID
DA12 . . . Communication module
DA13 . . . Decode module
FIG. 3B
Contents data
FIG. 4A
DA11 . . . Medium ID
DA12 . . . Communication module
DA13 . . . Decode module
FIG. 4
Right . . . Contents data
DA14 . . . Limitation information
FIG. 5, from above, from left
Front elevational view
Side elevational view
Top plan view
Bottom plan view
FIG. 6
100 . . . Plate-shaped memory
110 . . . Control IC
110a . . . Flash memory controller
110b . . . Register
110c . . . Page buffer
110d . . . Serial I/F
111 . . . Flash memory
111a . . . IPL area
FIG. 7A
Top . . . Download (write) of contents data
Bottom . . . Erase
In 111a, from above
   Medium ID Communication module
Decode module
FIG. 7B
In 111a, from above
Medium ID
Communication module
Decode module
Contents data
FIG. 8
12 . . . Memory
In 12 . . . Free area
A4 . . . Medium writing application
A3 . . . Downloading application
A12 . . . Decode module
A12-1 . . . Cipher decode module
A12-2 . . . Decompression module
A2 . . . Accessing application
A11 . . . Communication module
FIG. 9
S101 . . . Medium loaded?
S102 . . . Data for downloading recorded?
S103 . . . Start automatic processing of download
S104 . . . Read in and develop data for downloading into memory
S105 . . . Refer to medium ID
S106 . . . Access to content server (communication module)
S107 . . . Transmit medium ID to content server
S108 . . . Reception of contents list
S109 . . . Display contents list
S110 . . . Selective designation of contents data
S111 . . . Charging process possible?
S112 . . . Request for download of contents data
S113 . . . Reception
S114 . . . Playback limitation?
S115 . . . Decipher (decode module)
S116 . . . Record into medium
FIG. 10
S201 . . . Playback request?
S202 . . . Start automatic playback process of contents
S203 . . . Refer to medium ID
S204 . . . Access to content server (communication module)
S205 . . . Request for limitation information (with medium ID added)
S206 . . . Reception of limitation information
S207 . . . Limitation information regarding number of times?
S208 . . . Limitation information regarding term
S209 . . . Within playback allowing term?
S210 . . . Play back contents including decipher process
S211 . . . Playback time number P←P−1
FIG. 11
1 . . . Media shop
2 . . . Medium server
2a . . . User management DB
Between 2a and 5 . . . Additional purchase of contents (cancel of playback limitation, etc.)
3 . . . Content server
3a . . . ID database
3b . . . Contents DB
5 . . . User terminal equipment
In 5 . . . User
6 . . . Communication network
①. . . Wholesale of charged medium
②. . . Sales of medium
③. . . Designation of contents supply source, selection of playback limitation (time number, term, no)
④. . . Payment of contents charge+medium charge
⑤. . . Registration of medium ID, contents supply source, playback limitation
⑥. . . Contents charge (amount for payment on delivery)
⑦. . . Medium ID
⑧. . . Medium ID
⑨. . . Approval of utilization of contents
Right to ⑨. . . Charge for additionally purchased contents
⑩ . . . Distribution of contents over network
FIG. 12
S301 . . . Medium loaded?
S302 . . . Data for downloading recorded?
S303 . . . Start automatic processing of download
S304 . . . Read in and develop data for downloading into memory
S305 . . . Refer to medium ID
S306 . . . Access to content server (communication module)
S307 . . . Transmit medium ID to content server
S308 . . . Reception of contents list
S309 . . . Display contents list
S310 . . . Selective designation of contents data
S311 . . . Request for download of contents data
S312 . . . Reception
S313 . . . Playback limitation?
S314 . . . Decipher (decode module)
S315 . . . Record into medium

What is claimed is:

1. A downloading method, comprising:

a readout step of reading out program information, from a recording medium having a first storage region wherein the program information describes a procedure for executing a process for establishing a connection to a predetermined server over a predetermined communication network and downloading data from the connected server is stored, a second storage region into which the data is written, and a third storage region having an ID unique to said recording medium stored therein, the ID identifying at least the type of medium on which the medium ID is stored;

an access step of accessing said server in accordance with the read out program information;

an acquiring step of acquiring a list of selectable content data selected by the server based on the medium ID identified by the server, the content data are divided into two types, a first of the two types includes content data to which some playback limitation in regard to the number of times of playback is applied, a second of the two types includes content data to which no playback limitation is applied;

a transferring step of transferring the list of content data selected in accordance with the identified type of medium;

a download step of downloading required data from said server accessed in accordance with the read out program information; and a storage control step of storing the data acquired by the downloading into said second storage area of said storage medium, wherein the list of selectable content data includes content data names and prices of the content data.

2. A recording apparatus, comprising:

a readout unit configured to read out program information and a unique ID from a recording medium, wherein the program information describes a procedure for executing a process for establishing a connection to a predetermined server and downloading data from the server, the unique ID is information which that is utilized by the server to at least identify from the ID, the type of medium on which the medium ID is stored and to manage accounting for the downloaded data;
a memory configured to store data;
a display device configured to display a list of selectable content data transmitted from the server and selected by the server based on the type of medium identified by the server, the content data are divided into two types, a first of the two types includes content data to which some playback limitation in regard to the number of times of playback is applied, a second of the two types includes content data to which no playback limitation is applied; and
a controller configured to control a download of required data from the server in accordance with the read out program information, and store the data acquired by the downloading with identification information indicating a relationship to the program information into the memory,
wherein the list of selectable content data includes content data names and prices of the content data.

3. A recording apparatus, comprising:
means for reading out program information and a unique ID from a recording medium, wherein the program information describes a procedure for executing a process for establishing a connection to a predetermined server and downloading data from the server, the unique ID is information which that is utilized by the server to at least identify from the ID, the type of medium on which the medium ID is stored and to manage accounting for the downloaded data;
means for storing data;
means for displaying a list of selectable content data transmitted from the server and selected by the server based on the type of medium identified by the server, the content data are divided into two types, a first of the two types includes content data to which some playback limitation in regard to the number of times of playback is applied, a second of the two types includes content data to which no playback limitation is applied; and
means for controlling a download of required data from the server in accordance with the read out program information, and storage of the data, by the means for storing data, acquired by the downloading with identification information indicating a relationship to the program information into the memory,
wherein the list of selectable content data includes content data names and prices of the content data.

4. A recording method for a recording apparatus having a memory, comprising:
a readout step of reading out program information and a unique ID from a recording medium, wherein the program information describes a procedure for executing a process for establishing a connection to a predetermined server and downloading data from the server, the unique ID is information which that is utilized by the server to at least identify from the ID, the type of medium on which the medium ID is stored and to manage accounting for the downloaded data;
a downloading step of downloading required data from the server in accordance with the read out program information; and
a storage control step of storing the data acquired by the downloading with identification information indicating a relationship to the program information into the memory,
wherein at least a part of data provided by the server includes a list of selectable content data selected by the server based on the type of medium identified by the server, the content data are divided into two types, a first of the two types includes content data to which some playback limitation in regard to the number of times of playback is applied, a second of the two types includes content data to which no playback limitation is applied,
wherein the list of selectable content data includes content data names and prices of the content data.

5. A playback apparatus comprising:
a readout unit configured to read out program information and a unique ID from a recording medium, wherein the program information describes a procedure for executing a process for establishing a connection to a predetermined server and downloading data from the server, the unique ID is information which that is utilized by the server to at least identify from the ID, the type of medium on which the medium ID is stored and to manage accounting for the downloaded data;
a memory configured to store content data with identification information indicating a relationship to the program information;
a display device configured to display a list of selectable content data transmitted from the server and selected by the server based on the type of medium identified by the server, the content data are divided into two types, a first of the two types includes content data to which some playback limitation in regard to the number of times of playback is applied, a second of the two types includes content data to which no playback limitation is applied; and
a controller configured to playback the content data based on the read out program information,
wherein the list of selectable content data includes content data names and prices of the content data.

6. A playback method for a playback apparatus having a memory comprising:
a readout step of reading out program information and a unique ID from a recording medium, wherein the program information describes a procedure for executing a process for establishing a connection to a predetermined server and downloading data from the server, the unique ID is information which that is utilized by the server to at least identify from the ID, the type of medium on which the medium ID is stored and to manage accounting for the downloaded data;
a playback step of playback content data with identification information indicating a relationship to the program information from the memory based on the read out program information;
an acquiring step of acquiring a list of selectable content data based on the unique ID; and
a transferring step of transferring the list of content data selected by the server in accordance with the type of medium identified by the server, the content data are divided into two types, a first of the two types includes content data to which some playback limitation in regard to the number of times of playback is applied, a second of the two types includes content data to which no playback limitation is applied,
wherein the list of selectable content data includes content data names and prices of the content data.

* * * * *